United States Patent [19]

King et al.

[11] Patent Number: 4,639,733

[45] Date of Patent: Jan. 27, 1987

[54] DIRECTION FINDING

[75] Inventors: Nigel J. R. King; Ian W. N. Pawson, both of Bracknell; Michael P. Baker, Reading; Robert N. Shaddock, Binfield; Edward V. Stansfield, Earley, all of England

[73] Assignee: Racal Communications Equipment Limited, Berkshire, England

[21] Appl. No.: 609,232

[22] Filed: May 11, 1984

[30] Foreign Application Priority Data

May 11, 1983 [GB] United Kingdom ............... 8312942

[51] Int. Cl.[4] .............................................. G01S 5/02
[52] U.S. Cl. ............................... 342/424; 342/423; 342/417; 342/442; 342/444; 342/445; 342/434
[58] Field of Search ............... 343/424, 423, 444, 417, 343/442, 445, 434, 403, 406, 425, 433, 394, 400, 401, 402, 396, 397, 374, 446

[56] References Cited

U.S. PATENT DOCUMENTS

| 3,787,863 | 1/1974 | Watanabe et al. | 343/424 |
|---|---|---|---|
| 3,887,923 | 6/1975 | Hendrix | 343/424 |
| 3,973,262 | 8/1976 | Böhm | 343/445 |
| 4,203,114 | 5/1980 | Gerst et al. | 343/442 |
| 4,209,791 | 6/1980 | Gerst et al. | 343/442 |
| 4,333,170 | 1/1982 | Mathews | 367/125 |
| 4,387,376 | 6/1983 | Sherrill et al. | 343/424 |

FOREIGN PATENT DOCUMENTS

| 0116777 | 8/1984 | European Pat. Off. |
|---|---|---|
| 2011147 | 9/1971 | Fed. Rep. of Germany . |
| 2385105 | 3/1978 | France . |
| 2130563 | 3/1978 | France . |
| 1377574 | 12/1974 | United Kingdom . |
| 1455929 | 11/1976 | United Kingdom . |
| 1534131 | 11/1978 | United Kingdom . |
| 1536996 | 12/1978 | United Kingdom . |
| 2064257A | 6/1981 | United Kingdom . |

Primary Examiner—Theodore M. Blum
Assistant Examiner—David Cain
Attorney, Agent, or Firm—Leydig, Voit & Mayer

[57] ABSTRACT

An interferometer type DF system uses an array of five antennas (A,B,C,D,E) arranged at the apices of a regular pentagon to define five wide apertures along the sides of the pentagon and a further five apertures along the diagonals. The phases of the signals received by each antenna, are measured modulo $2\pi$ and processed to give a unique bearing of the radio source to the accuracy of the widest aperture defined by the array. One method of processing the phases is to calculate from them the Fourier coefficients of the Fourier series representing the spatial phase distribution. By comparing the difference between each calculated coefficient and a corresponding order coefficient of a set of imaginary antenna phases expressed as integral multiples of $2\pi$, the complete $2\pi$ phase differences between the measured phases modulo $2\pi$ can be found. The bearing angle of the received signal is then the phase of the vector resulting from subtracting the first order Fourier coefficient of the integral phases from the calculated first order coefficient.

9 Claims, 4 Drawing Figures

DIRECTION FINDING

BACKGROUND OF THE INVENTION

1. Technical Field

The present invention relates to radio direction finding systems and, more specifically, to systems of the interferometer type.

2. Prior Art

Interferometer type DF systems use at least two spaced antennas which each receive a radio signal the bearing direction of which is to be found. Comparison of the phases of the signals received by the antennas allows a number of possible bearings for the radio source to be calculated. The multiple bearings calculated are referred to as ambiguities as only one bearing value is correct. DF systems of this type become more accurate as the spacing between the antennas is increased relative to the wavelength of the radio signal. This spacing is referred to as the "aperture". A narrow aperture system, i.e. one where the spacing between the antennas is less than one wavelength, will produce few ambiguities but may be subject to considerable error in the possible bearing values calculated, particularly in a case where a significant proportion of the signal energy is being received by the antennas after reflection from some intermediate object. A wide aperture system is more accurate but produces a large number of ambiguities. For example a pair of antennas defining a narrow aperture of width equal to about a quarter of a wavelength or less will produce only one ambiguity, whereas a one wavelength aperture will produce three ambiguities and a wide aperture equal to five times the wavelength will produce 23 ambiguities. However for a five wavelength aperture the error in the bearing will be considerably smaller than that produced by the narrow aperture even in a case where the received signal includes a relatively large reflected component.

A single aperture is not very sensitive for detecting the bearing of a received radio signal when the source is lined up with the antennas defining the aperture.

In order to provide 360° coverage, that is good sensitivity to radio sources at any bearing it has been proposed to use an arrangement of three antennas in a triangular configuration, for example a right angled triangle or an equilateral triangle, in order to define two apertures transverse to one another. If the apertures between the antennas are chosen to be wide then this type of arrangement gives good sensitivity and accuracy but still produces an unacceptably large number of ambiguities. For example using an isosceles right angled triangle with the equal perpendicular apertures each approximately twice the wavelength of the radio source, ten possible bearings, some of which may be coincident, are calculated for each aperture with a typical 30 degree spacing.

It is also known that these ambiguities can be resolved at least to some extent by using such a wide aperture interferometer system together with a narrow aperture system. Such systems may each use separate antennas or have one antenna in common. Typically both systems will use at least three antennas. Such a system is described in GB-2101440A in the name of Racal-SES Limited. In such a combined system the approximate but unambiguous bearing output from the narrow aperture system is compared with the multiple outputs from the more accurate wide aperture system. The closest one of these multiple outputs to the unambiguous output is output as the bearing of the radio source. A problem encountered with such systems arises out of this comparison. For example if the wide aperture system has an aperture equal to five wavelengths the multiple bearing outputs will be closely spaced at typically 7.2 degrees. If the narrow aperture system has an error of greater than half this angular spacing it is possible for the wrong one of the multiple wide aperture bearings to be chosen as the output. This effectively increases the error.

The technical problem of providing an accurate direction finding system using a small number of antennas and receivers remains to be solved.

Other prior art systems have used very large circular arrays of antenna, where each antenna is spaced less than half a wavelength from its neighbour. Such systems are described in GB-No. 1536996A and GB-No. 1455929A. These systems require large numbers of antennas together with complex processing procedure in order to provide adequate wide aperture accuracy. It has hitherto not been thought possible to use such a large circular array in an interferometer type DF system with wide aperture spacings between adjacent antennas.

Therefore enabling a practical interferometer type DF system to be formed with a wide aperture large circular array presents a further technical problem.

SUMMARY OF THE INVENTION

The object of the present invention is to solve the technical problems referred to above.

The present invention provides an interferometer type DF system comprising a non-linear array of at least five antennas arranged so as to provide 360° coverage, and such that the spacing between any pair of antennas is greater than a wavelength of the radio signal to be received.

It has been found that by utilising at least five antennas in a wide aperture system the necessary accuracy can be obtained using any of several processing techniques to be described and also it has been found that five antennas provides a sufficient number of distinct apertures of varying widths and inclinations to the incoming signal to resolve the ambiguities to an acceptable degree.

Preferably the array is a circular array and a prime number of antennas is utilised.

A preferred method of solving the technical problem of analysing the signals received by the antennas comprises the steps of measuring the relative phases of the signal received at each antenna modulo $2\eta$ for at least one sample frequency, calculating at least some of the coefficients of the Fourier series of the spatial phase distribution from the measured discrete antenna phases for the or each sample frequency, comparing the calculated Fourier coefficients with a selected plurality of stored coefficients each calculated for a particular set of antenna phases differing by integer multiples of $2\eta$ only, determining the particular set of integer phases which provides the best fit with the calculated coefficients, and calculating the bearing of the received signal (if any) at the or each sample frequency by effectively substituting the determined set of integer values into a Fourier coefficient containing the bearing information and deriving the bearing angle therefrom.

It has been found that by an appropriate choice of the values to compare with the difference between the calculated and stored Fourier coefficients the required set of integers can be accurately determined even where there is considerable reflection and other noise or interference.

In a DF system with a circular antenna array and a central antenna, the zero order Fourier coefficient calculated from the antennas on the circle should be equal to the measured phase at a central antenna and the set of integers which give the closest approximation to this value are selected in a preferred embodiment.

A further constraint is provided by the magnitude of the first order coefficient which should be equal to or less than half the radius of the array expressed in wavelengths of the received signal.

In a preferred embodiment, the elevation of the received radio signal can be measured as the arccos of twice the magnitude of the first order Fourier coefficient divided by the radius of the array in wavelengths of the received signal at the or each sample frequency.

The number of non-repetitive Fourier coefficients that can be calculated from the discrete antenna phases depends on the number of antennas in the array. For five antennas, only three coefficients are distinct. Second order and higher coefficients should be equal to zero, but may be finite because of noise, / reflections or interference. The magnitude of these higher order coefficients may be used to provide an indication of the noise present and therefore provide an assessment of the confidence that may be placed on the accuracy of the output bearing value at the or each sample frequency.

DESCRIPTION OF PREFERRED EMBODIMENTS

Figure 1:
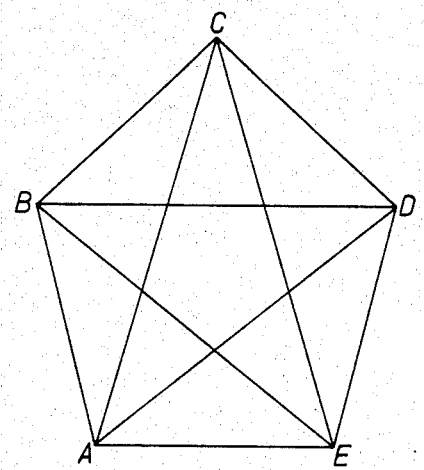
FIG. 1 is a diagram illustrating the arrangement of antennas for use in the inteferometer type DF systems.

FIG. 1 illustrates a preferred embodiment of five antennas which provides ten different wide apertures between the five antennas A, B, C, D and E. The antennas are arranged at the apices of a regular pentagon. The five sides of the pentagon provide five equal apertures, the planes of which are equally spaced at 72 degrees. The arrangement also provides a further five equal apertures defined by the diagonals of the pentagon. Each of these diagonal apertures is parallel to one of the apertures defined by the sides of the pentagon, but the diagonal apertures are wider. The ten apertures represented by this array are AB, BC, CD, DE, EA, AD, AC, BE, BD and CE. In a variation, a central antenna may also be used, to provide additional information which is particularly useful where the DF system is required to provide the elevation as well as the horizontal bearing of the received signal.

As will be appreciated the possible horizontal bearing values $\theta$, which can be calculated from the phase difference across a single wide aperture are given by the solutions to the equation:

$$\sin \theta = [(p+n)/d]$$

where p is the phase difference measured in wavelengths of the received signal, d is the width of the aperture in wavelengths of the received signal, and n takes the integer values from O to N successively where N is the largest integer such that $N+p<d$.

It has been found that by comparing the phase differences between the signals received at the two antennas of each of the ten apertures, a unique bearing for the radio source can be calculated to the maximum accuracy of the widest aperture. For a five antenna array as depicted, the aperture defined by the sides of the pentagon may each be many times the wavelength of the received radio signal.

Although the arrangement of five antennas in a pentagon is preferred, it is also possible to arrange more than five antennas to produce a number of wide apertures giving 360° coverage. It is preferable to arrange the antennas in a regular array to simplify the analysis. However, provided the orientation and width of the various apertures are known, it will be possible to use any irregular arrangement of the antennas provided at least five non-parallel wide apertures are reasonably evenly spread over 360°. As regards alternative regular arrangements of the antennas, it will be seen that a regular hexagon will provide only a little further information than the triangular arrays of the prior art, but significantly less information than that available from the pentagon, and therefore such an arrangement is not suitable. A regular heptagon would be acceptable, as would other regular figures with a prime number of sides. The arrangement with five antennas is, however, advantageous in that it provides good results with a small number of antennas.

Figure 2:
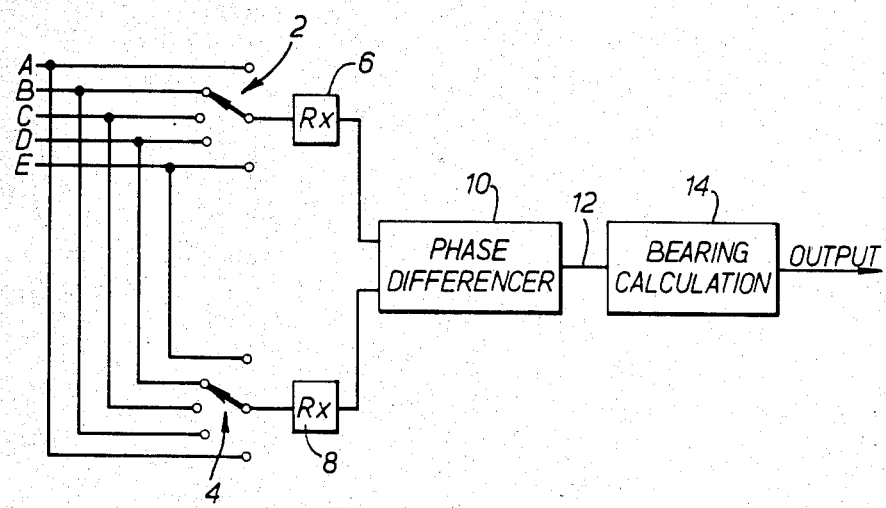
FIG. 2 is a block circuit diagram of a first embodiment of a DF system.

A simple DF system using an array of five antennas arranged at the apices of a regular pentagon is illustrated in FIG. 2. The signal received from each of the antennas A, B, C, D, E is fed to respective teerminals of two commutator switches 2, 4. The signals selected by the switches 2, 4 are fed to respective receivers 6, 8 which are tuned to the signal from the radio source the bearing of which is to be calculated. The intermediate frequency outputs from the respective receivers 6, 8 are fed to respective inputs of a phase differencer 10. The commutator switches 2, 4 are controlled so that the phase difference across each of the ten apertures defined by the antenna array is sequentially sampled. The phase difference for each aperture in turn is output along a line 12 to a bearing calculation device 14.

The calculation device 14 may employ any of various calculation methods to derive the final unambiguous bearing output from the measured phase differences. A suitable technique is to use what will be described as the "histogram method". In this method, all the possible bearing values are calculated from the phase difference across each aperture. A histogram is then formed of the number of possible bearing values falling in each narrow range of possible bearings. By examining the resulting histogram it can be seen that a large number of possible bearing values will occur in one or more particular ranges. In ideal circumstances the number of possible bearing values at the correct bearing will equal the number of apertures analysed. However, in most radio environments there is some degree of reflection and other noise which would cause at least one aperture not to give an estimate of the bearing within the accuracy of the chosen bearing range. The bearings selected to be output are those ranges which contain greater than a predetermined number of possible bearing values. For example, if ten apertures are analysed then any bearing range which has accumulated more than, say, eight values is output as the bearing of a signal received at that frequency. A suitable width for the histogram ranges is 2° when ten apertures of a pentagonal antenna array are analysed.

It will be appreciated that it is not necessary to utilise all the information provided by the antenna array. For example only a subset of the ten apertures need be analysed. The use of the wider diagonal apertures will produce more ambiguities and greater accuracy than the narrower apertures forming the sides of the pentagon.

Another possible method of bearing calculation includes providing a store into which the expected phase differences across each of the apertures for a range of different bearings and different frequencies has been loaded. The phase differences may be derived from field measurements or by prior calculation. A comparison of the measured phase differences across the apertures produced on line 12 with the various sets of stored reference phase differences will produce a unique bearing output after adjustment for any difference in frequency between the actual frequency of the received radio signal and the closest reference frequency. In this method the bearing calculation block 14 will include a memory in which the reference phase differences are stored.

A preferred method of bearing calculation involves deriving the Fourier series coefficients of the spatial phase distribution, and deriving the bearing angle from the first order coefficient as discussed in more detail below in connection with the embodiment of FIG. 3.

Figure 3:
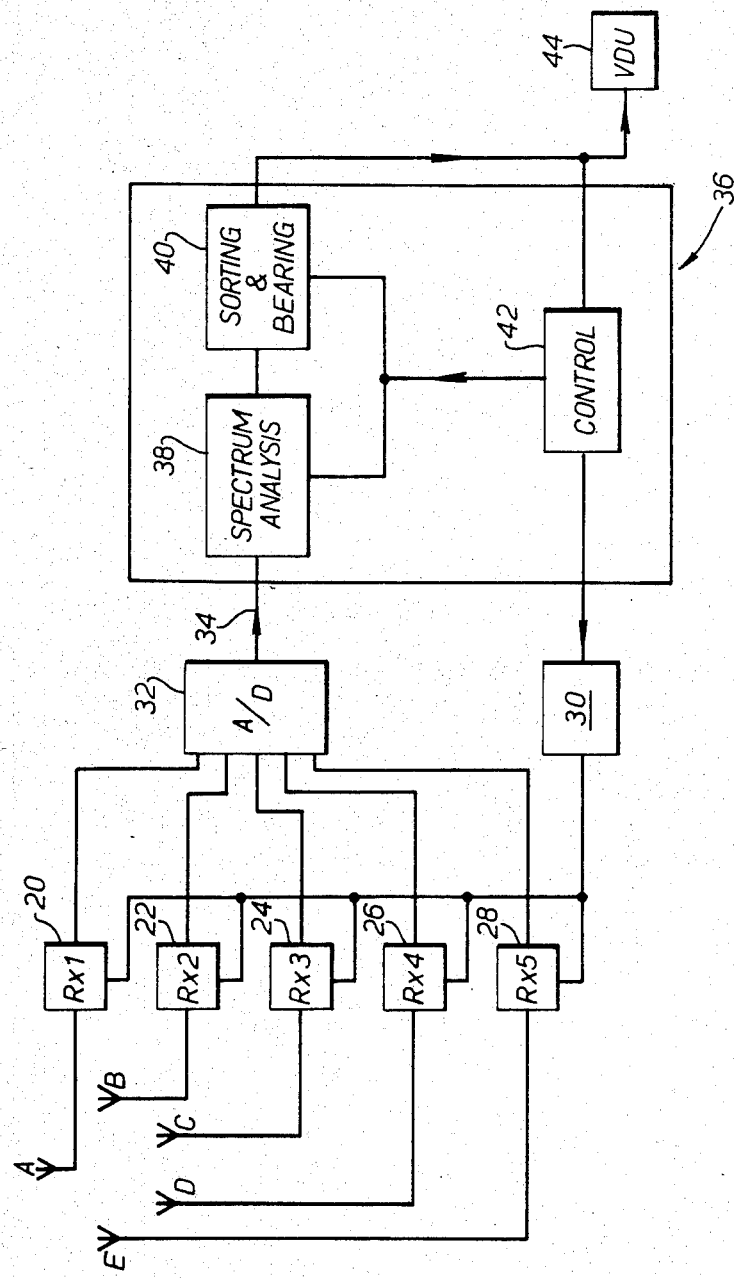
FIG. 3 is a block diagram of another DF system.

FIG. 3 illustrates a more complex interferometer DF system utilising the antenna array as previously described. In this case each of the antennas A, B, C, D, E is provided with its own receiver 20, 22, 24, 26, 28. Each receiver is connected to a common local oscillator 30. In this system the receivers do not need to be tuned accurately to the radio signal to be received but may be arranged to receive all signals in a particular band. The intermediate frequency outputs from the receivers 20 to 28 are fed to a sample and hold type analogue to digital converter 32 which produces an output along the line 34 to a digital signal processor 36.

The digital signal processor 36 includes a spectrum analyser 38 which receives the digitized output representing the signals received by each of the five antennas. The spectrum analyser 38 divides the band of received signals from each antenna into a number of smaller frequency intervals, referred to below as sample frequencies, and measures the amplitude and phase of the signal energy received at each of these sample frequencies. The phase information may be derived by including Fourier transform circuitry within the analyser 38. This circuitry takes the Fourier transform with respect to time of each antenna signal. The Fourier transform is taken over a finite time modified by a suitable window. Those skilled in the art will appreciate that various techniques may be utilised to carry out such a Fourier transform with any appropriate algorithm on the digital samples. The output of the Fourier transform circuitry will be equal to the product of the number of antennas and the number of sample frequencies. For example if 32 sample frequencies are used with an array of five antennas there will be 160 digital word outputs for each time interval, each representing the Fourier transform of a particular antenna signal at a particular sample frequency. The actual phase of that antenna signal at the particular sample frequency is obtained by taking the four quadrant inverse tangent of the ratio of the imaginary and real components of the Fourier transform at positive frequencies.

Figure 4:
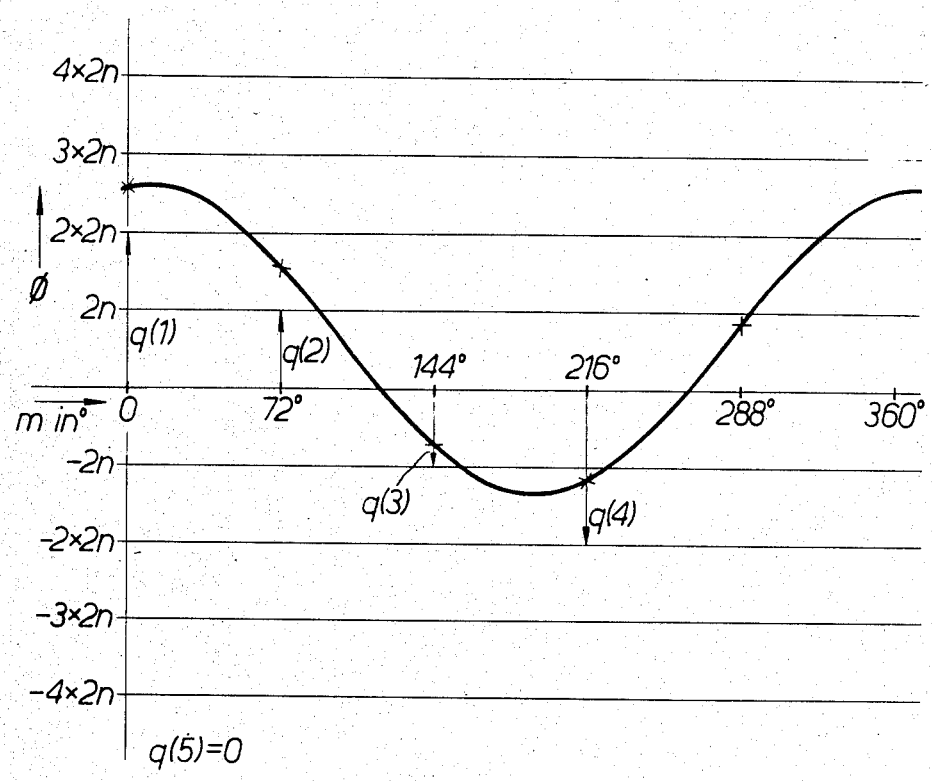
FIG. 4 is a diagram illustrating the measured phases $\phi$ at each antenna relative to an angular spatial coordinate m.

For an m antenna array as illustrated in FIG. 1 and also used in the present embodiment the phase at the mth antenna at a sample frequency $\omega_o$ are given by the following:

$$\phi(m, \omega_o) = -\omega_o T + R \sin(d + 2\pi nm/M) + 2\pi q(m) \qquad (I)$$

where
T=time reference of radio source
R=$r\omega_o/c$
r=radius of array
c=velocity of propogation
d=$(\pi/2)-b$
b=bearing angle
and q(m) is an unknown integer such that $|\phi(m,\omega_o)| \leq \pi$ It should be noted that the phase estimated in this way is in effect the phase of the antenna signal with respect to a virtual reference signal cos ($\omega_o t$). The $2\pi q(m)$ term arises because a reference signl cos ($\omega_o t$) is indistinguishable from a reference signal cos ($\omega_o t - 2\pi q(m)$). FIG. 4 illustrates the phases measured at the antennas. Since the antennas are assumed to be on the periphery of a circle their position can be represented by an angular spatial coordinate m which in the illustrated example represents the number of the antenna in the range 1 to 5. Alternatively it may be considered as the angle between a fixed radius and a radius to each antenna in turn measured in units of 72°. The measured phases modulo $2\pi$ are the difference between the illustrated phase and the associated $2\pi q(m)$.

The phase information is passed to a sorting and bearing processor 40 together with the data on the amplitude of the signal received at each sample frequency.

Processor 40 analyses the spectral energy received by each antenna to determine where in the spectrum there is a radio signal being received. The processor 40 may use any of the techniques so far described which operate on the phase differences across the various apertures. The required phase differences may readily be calculated by differencing the relative phases output by the spectrum analyser 38 for the respective antennas of each aperture to be analysed.

In a preferred embodiment the processor 40 includes circuitry which calculates the Fourier series coefficients of the spatial phase distribution. The calculated phases $\phi(m,\omega_o)$ may be regarded as discrete samples from a continuous phase distribution created by the radio signal being received at that sample frequency. This continuous phase distribution may be represented as a Fourier series in accordance with well known mathematical principles. Thus:

$$\phi(m,\omega_o) = \Sigma_n A_n(\omega_o) \exp(-j2\pi nm/M) \qquad (II)$$

The Fourier coefficients $A_n(\omega_o)$ may be calculated from the following formulae:

$$A_n(\omega_o) = 1/M \Sigma_m \phi(m,\omega_{107}) \exp(j2\pi nm/M) \qquad (III)$$

From this formula the zero order coefficient where n=0 reduces to the average of the antenna phases. It will be noted that the summation only covers the phases of the antennas on the periphery of the circular array. The zero order coefficient gives the phase centre of the array. Where a central antenna is provided then the measured phase at the central antenna should be equal to this zero order coefficeint.

The first order coefficient is given by:

$$A_1(\omega_o) = 1/M \Sigma_m \phi(m,\omega_o) \exp(j2\pi m/M)$$

Substituting for $\phi$ from equation (I) above and using the result that $\Sigma_m \exp(+j2\pi m/M) = 0$ we obtain:

$$A_1(\omega_o) = 1/M \Sigma_m R \sin(d + 2\pi m/M) \exp(j2\pi m/M) + 2\pi q(m) \exp(j2\pi m/M)$$

expanding the sine factor into complex exponentail form and utilising the previous result this gives:

$$A_1(\omega_o) = 1/M \Sigma_m Rj/2 \exp(-jd) + 2\pi q(m)\exp(j2\pi m/M) \quad\quad (IV)$$
$$= Rj/2 \exp(-jd) + 1/M \Sigma_m 2\pi q(m)\exp(j2\pi m/M)$$

The first term of the above equation may be regarded as a vector the magnitude of which is half the radius of the circular array expressed in wavelengths at the sample frequency, and the phase of which is the bearing angle b, since:

$$j \exp(-jd) = \exp(j(\pi/2 - d)) = \exp(jb).$$

The second term of equation (IV) is effectively the first order Fourier coefficient of the phase components due to the integral multiples of $2\pi$ in the actual antenna phases which cannot be measured.

For the case of five antennas there is also a second order Fourier coefficient. It can be shown that if there are no reflections or other interference then this coefficient should be equal to zero. This can be appreciated since a radio wave spaced far from the source should have a pure linear spatial phase distribution with respect to the source. By considering the effect of superimposing acircular array on said linear phase distribution it can be seen that the only non-zero Fourier coefficient should then be the first order coefficient. For seven antennas the third order coefficient can be calculated, and so on.

In order to determine the q(m) of the antenna phases, the Fourier coefficients up to an appropriate order for a number of sets of possible q(m) are stored in a random access memory RAM (not shown). For an array with a 4.5 wavelength radius each of the q(m) may be $0, \pm 1, \pm 2, \pm 3$ or $\pm 4$. For five antennas this gives $5^9$ or 1953125 possible sets of q(m). However logical considerations allow a large number of these sets to be eliminated from consideration as being impossible to achieve in practice. In practice it is probably only necessary to test 60 possible sets of q(m). In the arrangement illustrated in FIG. 4 the q(m) are the set $(2,1,-1,-2,0)$.

The bearing processor 40 calculates each of the Fourier coefficients from the phase data output from the spectrum analyser 38. Each of the stored coefficients is then deducted from the calculated coefficient and the result compared with a value dependent on the coefficient being considered. In the case of the zero order coefficient, the result is compared with the measured phase at the central antenna. If there is no central antenna then this coefficient is not used. For the first order coefficient, the magnitude of the result is compared with the radius of the array expressed in wavelengths. For second and higher order coefficients, where present, the result is compared in each case with zero.

The goodness of the fit of each set of q(m) to the constraints set out above may be established by a least squares method. The first order Fourier coefficient of the best set of q(m), that is the set which most closely meet all the available constraints, is then subtracted from the calculated first order coefficient and the bearing angle b recovered as the four quadrant inverse tangent of the ratio of the imaginary and real parts of the result. It will be appreciated that alternative approaches may be used to extract b from the formula of the equation (IV) once the q(m) are known. All these approaches are considered to effectively correspond to substituting the best set of q(m) into equation (IV).

For each sample frequency the resulting bearing is output to the VDU 44 together with the amplitude information derived from the spectrum analyser 38. The goodness of fit of the magnitude of the Fourier coefficients using the selected set of q(m) to the stored coefficients can also be displayed as a confidence factor. It will be appreciated that if a strong signal is received at a sample frequency and there is little reflection or noise then the amplitude will be high and the second or higher order Fourier coefficients will be close to zero. The time windows of the analyser 38 during which the signal is received may also be displayed. It will be appreciated that various display formats may be adopted in accordance with the required use.

The local oscillator 30, spectrum analyser 38 and sorting and bearing processor 40 are each under the control of a controller 42. The controller 42 determines the band of received signals to be analysed by its control of local oscillator 30. Controller 42 also determines the degree of spectrum analysis carried out by analyser 38. For example, if the frequency of the radio source to be located is known then only that portion of the received band needs to be analysed. The controller 42 may also determine the time period for which the output from each antenna is sampled. The sorting and bearing processor 40 may be capable of utilizing different algorithms for calculating the bearing and may use all or only some of the information provided from the analyser 38, for example it may analyse all the phases or only a subset of them. These features are under the control of controller 42.

So far it has been assumed that the radio signal is propagating towards the antenna array substantially horizontally. However HF transmissions may be reflected off the ionosphere and therefore be received from elevations of typically 60°-70°. If this elevation can be measured together with the horizontal bearing then a position fix on the radio source can be obtained.

It can be shown that the second term in the phase equation (I) becomes:

$$R \cos(x) \sin(d + 2\pi m/M)$$

where x is the angle of elevation of the received signal. Accordingly the first order Fourier coefficient has a first term as given in equation (IV) which is similarly modified by a factor of cos (x). This introduces an uncertainty into the constraint provided by the first order Fourier coefficient as it is now only possible to eliminate those sets of q(m) which give a difference between the calculated coefficient and the coefficient of the set of q(m) which has a magnitude greater than half the radius of the array in wavelengths. This is because |cos $|(x)| \leq 1$. For this reason if the elevation is likely to be significant and/or is to be measured, the array is provided with a central antenna so that the constraint on the zero-order coefficient can be used to give the best fit set of $q(m)$.

The analysis has so far been described in relation to a circular array of equally spaced antennas where the phase at each antenna has the form given in equation (I). However, it will be appreciated that the described method can be used for other non-linear arrangements of antennas provided the relative spatial positions of the antennas making up the array are known. The second term of the phase equation (I) will then generally have a more complex form but the $2\pi q(m)$ term will still be present. It will also generally be necessary to use two spatial coordinates to define the position of each antenna rather than merely the coordinate m used in equations (I) and (II) above. It is therefore necessary to consider a Fourier series in two dimensions.

The information contained in the various order Fourier coefficients will, however, be the same. It can be seen from equation (II) that the spatial phase distribution is dependent only on the received signal and it will not be modified by the disposition of the antennas. For example the zero-order coefficient will represent the phase centre of the array, and the first order coefficient will contain the bearing information.

It will be appreciated that regular circular array will not always be possible to achieve in practice. For example, the lie of the ground may make it necessary for the antennas to be unevenly spaced about a circle. If the constant radius can be maintained it is only necessary to define m more accurately, say in degrees from a reference radius. In the arrangement illustrated in FIG. 4 the values m=1 to 5 would become m=0°, 72°, 144°, 216° and 288° respectively and M instead of 5 would be 360°. Thus the actual angular positions of the five antennas would be used instead of those set out above. The summation would then be over the whole range of 360° but as only five values of the phase are known the factor 1/M ramains 1/5. Otherwise the processing and the significance of the Fourier coefficients will remain the same. It can be seen from FIG. 4 that if the positions of the antennas are shifted angularly, the measured phases will be different and possibly also the q(m) but the spatial phase distribution is unaltered.

We claim:

1. An interferometer-type direction finding system including at least five antennas defining a non-linear array providing 360° coverage, and such that the spacing between any pair of apertures is greater than a wavelength of the radio signal to be received, means for receiving radio energy detected by the antennas over a predetermined band, analysing means for effectively outputting the amplitude and relative phase of any radio signal received by each antenna in each of a plurality of frequency intervals within said band, means for effectively identifying from said output any received radio signal within said band, and means for processing only the relative phase at each antenna of any identified radio signal to produce only one possible value of the bearing of the source from which any said identified signal originates.

2. A system according to claim 1, wherein the array is circular.

3. A system according to claim 1, wherein the number of antennas is a prime number.

4. A system according to claim 2, wherein an additional antenna is provided at the centre of the circular array.

5. A system according to claim 1, wherein said processing means includes means for calculating the coefficents of the spatial Fourier series of the relative phases at the or each frequency interval, and means for comparing the calculated Fourier coefficients with the corresponding order Fourier coefficients of a selected set of antennas phases differing in integral multiples of $2\pi$, means for carrying out a least squares fit to determine the set of integral multiples of $2\pi$ in the phases, means for substracting the first order Fourier coefficient of the determined set from the caculated first order coefficient, and means for deriving the bearing as a four quadrant inverse tangent of the imaginary and real parts of the output of the subtraction means.

6. A system according to claim 1, wherein the analysing means comprises means for carrying out a discrete Fourier transform with respect to time of each received signal.

7. A system according to claim 1, wherein said processing means comprises means for accumulating all the possible bearing values of the received signal by analysing the phase difference across each of a plurality of apertures defined by the antennas of the array, and means for determining said one possible value by selecting the possible bearing value given by a significant number of said apertures.

8. A method of analysing the signals recieved by the antennas of a wide aperture non-linear interferometer type DF array of at least five antennas providing 360° coverage, comprising the steps of measuring the relative phases of the signal received at each antenna modulo $2\pi$ for at least one sample frequency, calculating at least some of the coefficients of the Fourier series of the spatial phase distribution from the measured discrete antenna phases for the or each sample frequency, comparing the celculated Fourier coefficients with a selected plurality of stored coefficients each calculated for a particular set of antenna phase differing by integer multiples of $2\pi$ only, determining the particular set of integer phases which provides the best fit with the calculated coefficients, and calculating the bearing of the received signal (if any) at the or each sample frequency by effectively substituting the determined set of integer values into a Fourier coefficient containing the bearing information and deriving the bearing angle therefrom.

9. A method according to claim 8, wherein the best fit is determined by a least squares method.

* * * * *